Nov. 24, 1959
F. H. HEIN
2,914,198
GRAIN BIN UNLOADING DEVICE
Filed Aug. 4, 1958
3 Sheets-Sheet 1
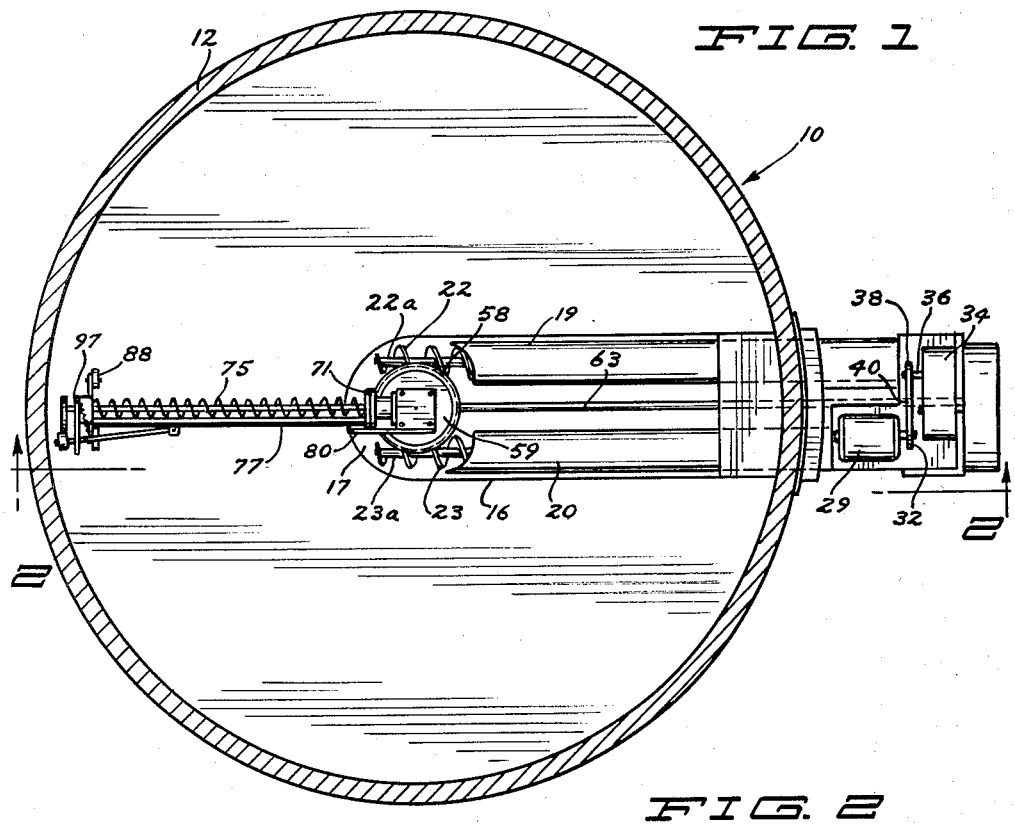
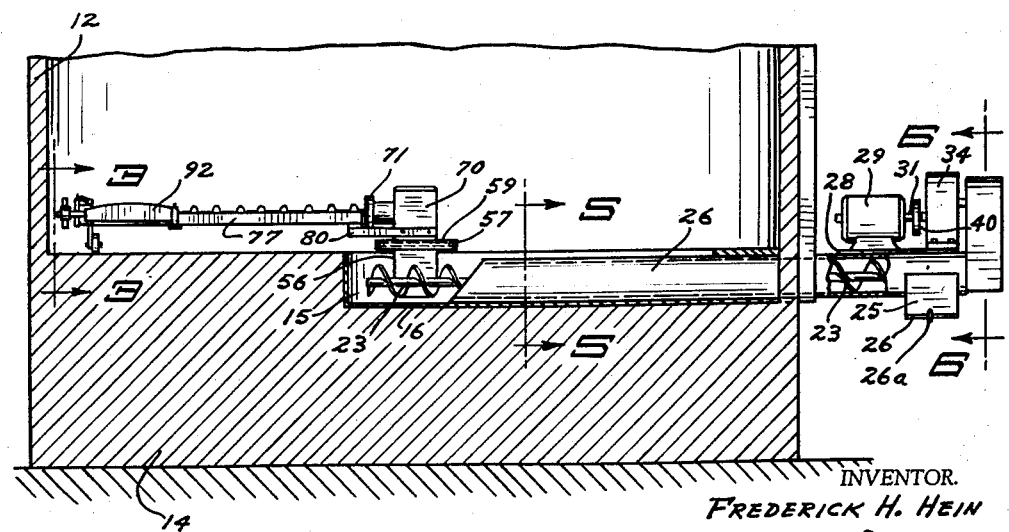
INVENTOR.
FREDERICK H. HEIN
BY
ATTORNEYS Nov. 24, 1959 — F. H. HEIN — 2,914,198
GRAIN BIN UNLOADING DEVICE
Filed Aug. 4, 1958 — 3 Sheets-Sheet 2
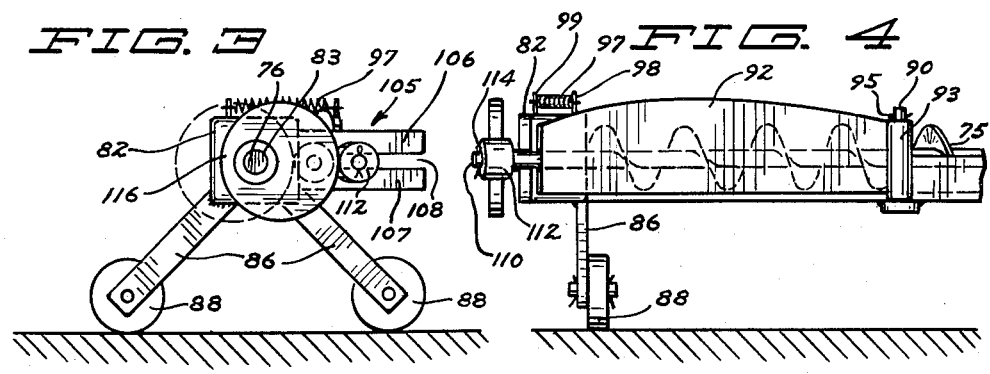
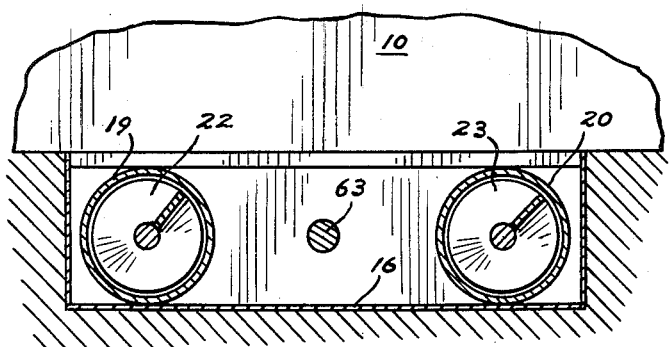
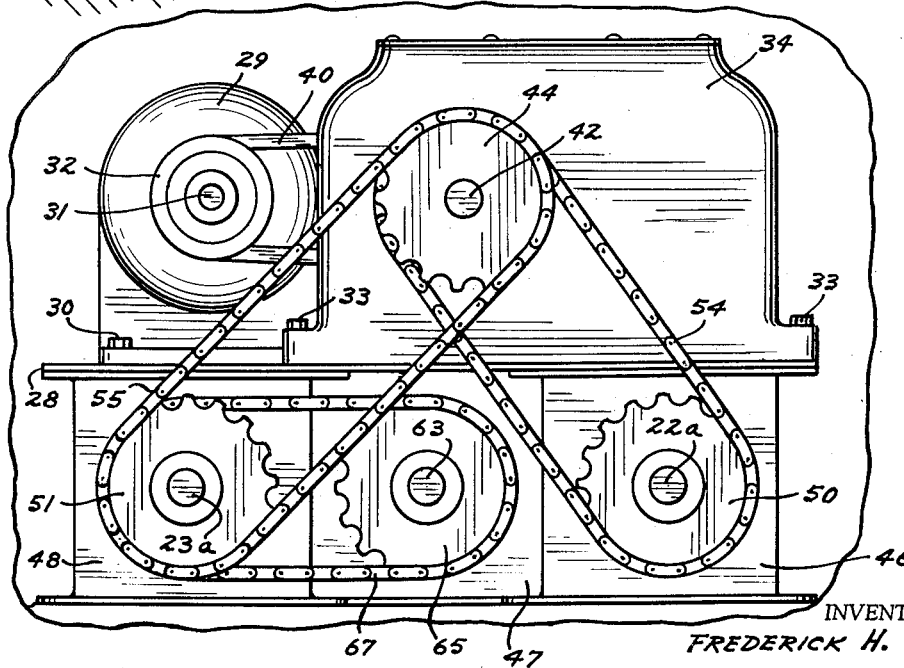
INVENTOR.
FREDERICK H. HEIN
BY *Reij and Gregory*
ATTORNEYS Nov. 24, 1959     F. H. HEIN     2,914,198
GRAIN BIN UNLOADING DEVICE
Filed Aug. 4, 1958     3 Sheets-Sheet 3
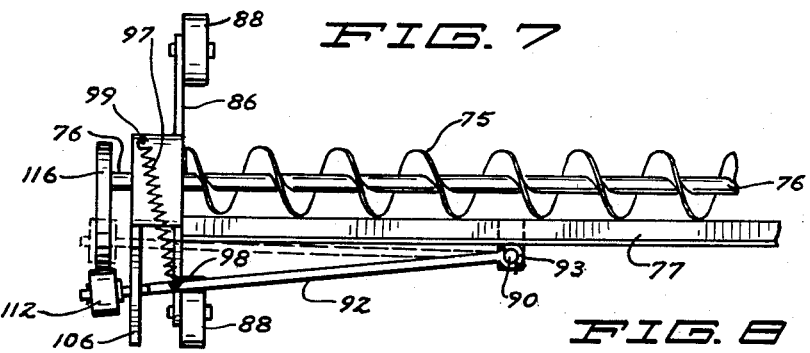
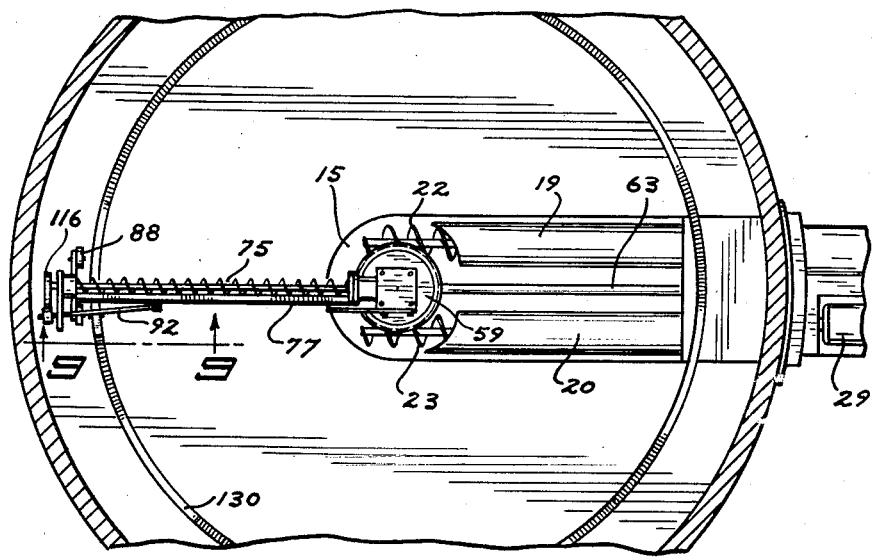
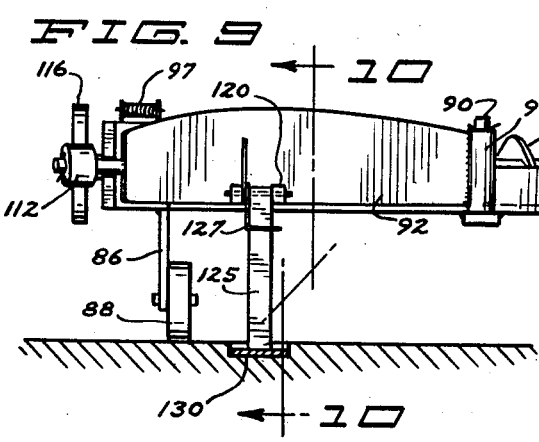
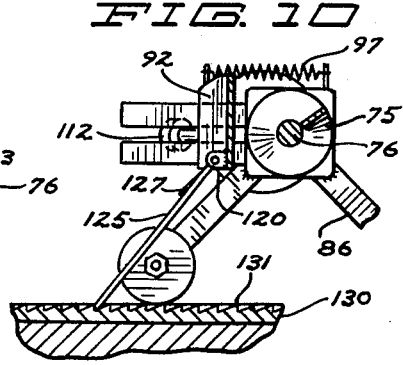
INVENTOR.
FREDERICK H. HEIN
BY
Reif and Gregory
ATTORNEYS

United States Patent Office 2,914,198
Patented Nov. 24, 1959

2,914,198
GRAIN BIN UNLOADING DEVICE

Frederick H. Hein, New Prague, Minn., assignor to AHMCO, Inc., Rochester, Minn., a corporation of Minnesota Application August 4, 1958, Serial No. 752,799

4 Claims. (Cl. 214—17)

This invention relates to a grain bin unloading device, and more particularly to an unloading device adapted for use with a cylindrical type bin. Grain in a bin when having a substantial moisture content has a tendency to pack and as a result tends to bridge over means used for unloading the same as from a given low point at the bottom of the bin. It is desirable to have means for unloading a grain bin which will affect the stored grain throughout the entire bottom area of the grain bin to prevent said grain from bridging and to cause it to flow freely to the bottom of said bin.

It is a common practice to unload a grain bin from a low point in the bottom thereof. Such a low point is commonly formed by having the bottom of a grain bin conical in form. Thus the grain flows by gravity to said low point. It is desirable to have a grain bin unloading device adapted to be used in connection with a flat bottomed grain bin. A substantial advantage is gained here that a flat bottomed grain bin has a substantially greater storage capacity than one having a conically formed bottom.

It is an object of this invention therefore to provide an unloading device to unload from the bottom of a grain bin and to provide such a device as is adapted to move throughout the entire bottom area of a grain bin to cause the grain therein to flow freely to the bottom thereof to prevent any tendency on the part of the grain to pack and bridge over the unloading device.

It is a further object of this invention to provide a grain bin unloading device particularly adapted for use in connection with a cylindrical flat bottomed grain bin adapted to have a grain unloading means sweep throughout the full area of the bottom of the grain bin and cause the grain therein to be unloaded from a central point in said grain bin.

It is a further object of this invention to provide a grain bin unloading device adapted to have the power operated means therefor located outside of the grain bin, an unloading means pivoted to a point centrally of the bottom of said grain bin with driving means at the free end of said unloading means, and said driving means being operatively connected to said power operating means at the outer side of said grain bin.

It is a more specific object of this invention to provide a grain bin unloading device adapted to have a radially extending conveying means for discharging grain from said bin, said means being received in the bottom of said grain bin, a second conveying means pivoted to the inner end of said first mentioned conveying means and adapted to be pivoted throughout the entire bottom area of said grain bin, said second means having driving means at its free end for driving it about said bottom area, and a source of power outwardly of said grain bin operatively connected to said first and second conveying means for driving the same.

These and other objects and advantages of the invention will be fully set forth in the following description made in connection with the accompanying drawings in which like reference characters refer to similar parts throughout the several views and in which:

Fig. 1 is a view in horizontal section of a grain bin showing a top plan view of applicant's device;

Fig. 2 is a view partially in vertical section taken on line 2—2 of Fig. 1, as indicated by the arrows and showing applicant's device in side elevation with a portion thereof broken away to show a detail of construction;

Fig. 3 is a view on a somewhat enlarged scale in end elevation taken on line 3—3 of Fig. 2, as indicated by the arrows, with some portions thereof in dotted line to show a change in position;

Fig. 4 is a view in side elevation on an enlarged scale of a portion of applicant's device with a portion thereof shown in dotted lines;

Fig. 5 is a view in vertical section on an enlarged scale taken on line 5—5 of Fig. 2 as indicated by the arrows;

Fig. 6 is a view in end elevation on an enlarged scale taken on line 6—6 of Fig. 2, as indicated by the arrows;

Fig. 7 is a view similar to Fig. 4 showing a top plan view on an enlarged scale of a portion of applicant's device with a part thereof shown in dotted line in a different position;

Fig. 8 is a view similar to Fig. 1 showing a modification of applicant's device;

Fig. 9 is a view taken on line 9—9 of Fig. 8 on an enlarged scale showing a detail of construction in side elevation; and Fig. 10 is a view taken on line 10—10 of Fig. 9 partially in vertical section and partially in side elevation on an enlarged scale.

With reference to Figs. 1 and 2, a partial view of a cylindrical grain bin 10 is shown having a wall structure 12 and being seated on a base 14. Said base is preferably formed of concrete. In connection with the embodiment of the applicant's invention here presented, a radially extending channel 15 is formed in said base 14 with said channel extending to an outer side of wall 12.

Disposed in said channel 15 is a metal trough 16 having a substantially flat bottom and having a semicircular end portion 17. Secured in said trough in spaced relation adjacent either side thereof are delivery tubes 19 and 20. Said delivery tubes will have their outer ends extend outwardly of said grain bin for some distance. The inner ends of said delivery tubes 19 and 20 terminate some distance short of the curved inner end of said trough 16. Conveying augers 22 and 23 respectively having shafts 22a and 23a are respectively located in said delivery tubes 19 and 20. Said delivery tubes and augers therein may be variously sized, but it has been found that a five to six inch conveying auger is of adequate size.

Said shafts 22a and 23a will extend outwardly of the otherwise closed ends of said tubes 19 and 20. A bottom opening will be provided in said tubes outwardly of said grain bin 10 communicating with an outlet box 25 secured to said tubes in any suitable manner. Said outlet box 25 will have a trap door 26 and a latch 26a for said trap door.

Carried on the outwardly extending portions of said delivery tubes 19 and 20 is a platform plate 28 which will be secured to said tubes in a suitable manner, as by welding. Mounted on said platform plate 28 is a motor 29 secured to said plate 28 by bolts 30. Said motor will be connected to a suitable source of power. Said motor 29 has a driveshaft 31 extending forwardly thereof and having a pulley 32 secured thereto. Mounted on said platform 28 forwardly of said motor 29 and secured to said platform by bolts 33 is a gear reduction box 34 having a driveshaft 36 extending rearwardly thereof and carrying a pulley 38 thereon. A drive belt 40 connects said pulleys 32 and 38. Said gear reduction box 34 has a driveshaft 42 extending forwardly thereof and carrying a pulley 44 thereon. Said pulley is here indicated as being of the sprocket type and adapted to have a plurality of sprockets pass thereover.

Depending from said plate 28 at the outer end thereof are members 46, 47 and 48 here indicated as being bearing brackets. The outer ends of said shafts 22a and 23a will be journaled through brackets 46 and 48 and will carry respectively at the outer sides of said brackets, sprocket pulleys 50 and 51. Said sprocket pulleys 50 and 51 will be respectively connected to said pulley 44 by sprocket chains 54 and 55. A gear box 56 is mounted on the inner end portion of said trough 16 between said augers 22 and 23.

Connected to said gear box 56 and extending horizontally through said trough 16 is a driveshaft 63 having its outer end journaled through bearing bracket 47. The outer end of said shaft 63 has secured thereto a sprocket pulley 65. A sprocket chain 67 passes over said sprocket pulleys 65 and 51.

Said gear box 56 which is partially shown in Fig. 2, has a plate member 57 mounted thereon. Rotatably mounted on said plate 57 is a friction plate 59. Said plate 57 has an annular flange 58 extending upwardly over the periphery of said plate 59. Carried on said plate member 59 is a gear housing 70 shown here to be substantially parallelepiped in form. A hub portion 71 forming a bearing extends outwardly of one side of said housing 70.

A conveyor auger 75 has one end of its shaft 76 journaled into said hub 71 and extending into said housing 70. A right-angled elongated frame member 77 extends along one side of said auger 75 and the bottom thereof. At its end adjacent the inner end of said auger said frame member 77 has an offset right-angled portion 80 secured to said housing 70. At its other end said frame member 77 has an upwardly turned right-angled portion 82 enclosing said end. Said right-angled portion 82 is apertured to form a bearing 83 into which is journaled and through which projects an extended portion of said shaft 76. Depending from the outer end portion of said frame member 77 is a substantially V-shaped bracket 86 having a pair of casters 88 mounted thereon.

Carried by said frame member 77 some distance inwardly from its outer or free end and extending outwardly therefrom somewhat is an upstanding pin bracket 90. A paddle 92 formed as an elongated plate member and having a sleeve bearing 93 formed at one end thereof is vertically disposed alongside of said frame member 77 and is journaled on said pin bracket 90 and is held thereon by a cotter key 95.

A coil spring 97 is provided having one end secured to a pin 98 upstanding from adjacent the free end of said paddle 92 and having its other end secured to a pin 99 upstanding from said angled end portion 82. Said spring serves to resiliently hold said paddle 92 adjacent said auger 75.

Extending outwardly at one side of said angled end portion 82 in the plane thereof is a bracket 105 formed of vertically spaced horizontally extending arms 106 and 107 respectively and having a slot 108 therebetween. Extending outwardly from the outer end of said paddle 92 as an extension thereof and carried thereby is a stub shaft 110 which is projected through said slot 108. A roller 112 is carried at the outer end of said shaft 110 and is held thereon by a cotter key 114.

A cam 116 is carried at the outer end of said shaft 76 in alignment with said roller 112.

Said shaft 63 and said shaft 76 will be operatively connected by suitable gearing in gear box 56 and housing 70 whereby rotation of said shaft 63 will rotate said auger 75 about its own axis. Said gearing is of well known and conventional type and it is not believed that a description of the same is necessary. Rotation of said auger 75 will rotate said cam 116.

In operation, a grain bin bottom will be prepared for installation of applicant's grain unloading device but having a radial trough formed therein. Positioned in said trough will be applicant's metallic trough 16 with the unloading conveyors 22 and 23 positioned therein adapted to convey said grain outwardly through said tubes 19 and 20 with said grain being unloaded through the trap door 26 in the outlet box 25.

Said augers as described will have sprocket gears mounted at the outer ends of their shafts and said sprocket gears will be operatively connected to the driving sprocket 44 and driving gear 42 in the gear reduction box 34, which in turn is operatively connected to said motor 29.

Pivotally mounted at the inner end of said trough 16 is an auger 75 operatively connected through suitable gearing to shaft 63. Said shaft 63 carries at its outer extended end, sprocket gear 65 which in turn is connected by a sprocket chain to sprocket gear 51 which through operative connection is driven by motor 29 as previously described. Rotation of said shaft 63 will rotate auger 75. Frame member 77 extends along one side of said auger 75 and along the bottom thereof and extends substantially to the free end of said auger 75. Said frame member 77 at its free end is supported by bracket 86 and casters 88. Said auger 75 has its shaft 76 journaled through the end portion of said frame member 77 and carries on the extended end portion of its shaft a cam 116. Said frame member 77 has a paddle 92 pivoted at its outer end portion and having a portion thereof movable in a slot formed by bracket 105 extending to one side of the end portion of said frame member 77. The roller 112 carried on the portion of the paddle 92 extending through the slot 108 is in alignment with said cam 116 and is adapted to be engaged thereby. As said cam rotates, it will move said roller 112 outwardly through said slot 108 and will move said paddle away from said auger 75 and said frame member 77. Said spring 97 will act to draw said paddle towards said frame 77 and said auger 75. Thus the action of said cam 116 and said spring 97 in cooperation serve to oscillate said paddle 92.

In a grain bin filled with free flowing material, such as small grains, the grain will tend to pack against the back side of said paddle 92. Thus the movement of the cam 116 will force said paddle 92 rearwardly against the grain packed therebehind, which in turn will impart a forward motion to auger 75. Thus the oscillation of paddle 92 will drive said auger 75 through the full circumference and through the full area of the bottom of grain bin 10. By moving through the entire area of the bottom of a grain bin, the packing and bridging effect of grain having a high moisture content is prevented and it is kept free flowing to the bottom of the bin.

Simultaneously with the movement of auger 75 through the bottom area of the grain bin, the rotation of said auger 75 upon its own axis moves the grain which it encounters towards the inner end portion of said trough 16 and into engagement with the exposed end portions of augers 22 and 23. Said augers 22 and 23 rotate simultaneously with said auger 75 and carry the grain delivered thereto outwardly to be unloaded through said outlet box 25.

Thus by use of a single remote source of power located outside of the grain bin by simple operative connections said auger 75 is rotated upon its own axis and is moved through the full area of the bottom of a grain bin.

With reference to Figs. 8–10, a modification comprising an addition to a portion of applicant's device is shown. All parts of applicant's device here shown identical to those previously described bear the same characters.

Carried adjacent the free end of said paddle 92 is a U-shaped bracket 120 having an elongated pin 125 pivoted therein and extending downwardly therefrom. A spring 127 has one end bearing against said paddle 92 and its other end bearing downwardly against said pin 125 to hold the same in a downward position under tension.

A circular track 130, as shown in Fig. 8, having upstanding saw tooth projections 131, is positioned on the bottom of said grain bin 10 somewhat inwardly of the periphery thereof. Said track 130 may be variously formed, but is here indicated as being formed of a metallic sheet material of narrow width.

Applicant's modified structure is adapted for use in a grain bin where free flowing material is not present to give continued solid backing to paddle 92 as it oscillates. Said pin 125 will be mounted on said paddle 92 as described, and as said paddle oscillates, said pin will engage the saw tooth portion of said track 130 to provide backing for urging said auger 75 forwardly. Said track 130 may be initially installed in a grain bin along with applicant's unloading device so that regardless of the type of material which is stored in said grain bin, applicant's device can be efficiently utilized for unloading the same.

Thus it is seen that I have provided a very efficient and simply constructed grain unloading device which has a wide utility and which requires but a single remote source of power for its operation. The essential novelty in applicant's device lies in the function of his auger 75, which through operative connection with a source of power for rotation upon its axis, provides its own source of power for its movement throughout the whole area of the bottom of a grain bin. Applicant's device has been produced on a commercial scale and has proved to be very successful.

It will of course be understood that various changes may be made in the form, details, arrangement and proportions of the parts, without departing from the scope of applicant's invention, which, generally stated consists in a device capable of carrying out the objects above set forth, in the parts and combinations of parts disclosed and defined in the appended claims.

What is claimed is:

1. A grain bin unloading device for use within a cylindrical grain bin having in combination, a radially extending trough recessed in the bottom of said grain bin, a pair of laterally spaced conveying augers disposed in said trough and extending outwardly of said grain bin, a third auger pivoted at one end adjacent the inner ends of said pair of augers, said third auger adapted to be moved throughout the full area of the bottom of said grain bin, a frame member extending along said third auger from the pivot point thereof to adjacent the free end thereof to support said auger, said auger and frame member being movable together, the shaft of said auger being journaled through the outer end of said frame member, a cam carried at the outer end of said shaft, a plate member pivoted for horizontal movement at one end to said frame member inwardly from the outer end thereof, said plate member having a shaft portion extending outwardly therefrom in the plane thereof, a roller carried at the end of said last mentioned shaft, a slotted bracket extending outwardly at a right angle from the end of said frame member, said last mentioned shaft extending through said slot in said bracket, a cam carried at the end of said shaft, said roller being engageable by said cam to move said plate member in a direction away from said third auger, a spring member to urge said plate member in the direction toward said third auger, driving means carried at the outer ends of said pair of augers for rotating said pair of augers, a shaft adapted to be rotated by said driving means extending between said pair of augers to the pivot point of said third auger, suitable gearing connecting said last mentioned shaft and said third auger to axially rotate said third auger and said third auger will rotate said cam whereby said cam is adapted to oscillate said plate member to move the same away from said third auger to engage the grain packed behind said plate member for urging said third auger forwardly about the bottom area of said grain bin.

2. The structure set forth in claim 1, a downwardly inclined floor engaging pin pivoted at one end adjacent the free end of said plate member to extend at a right angle therefrom, means carried by said plate member for urging said pin downwardly, and a circular track on the floor of said bin having upstanding saw-tooth projections whereby said pin is oscillated by said plate member to engage successive of said projections to advance said auger forwardly.

3. A grain bin unloading device for use within a cylindrical grain bin having in combination, a radially extending trough adapted to be recessed in the bottom of said grain bin, a pair of spaced augers disposed in said trough and extending outwardly of said grain bin, driving means carried at the outer ends of said augers, a third auger having one end pivoted to the inner end of said trough and extending radially of the bottom of said grain bin, means connecting said third auger with said driving means for axially rotating said third auger, a frame member extending along said third auger from the pivot point thereof to adjacent the free end thereof, a paddle pivoted to adjacent the end of said frame member at the free end of said auger for horizontal movement, a cam carried by said auger for oscillating said paddle, and a floor engaging pin pivotally carried by said paddle adapted to be oscillated thereby for moving said auger forwardly.

4. The structure set forth in claim 3, and a circular tooth-surfaced track in the floor of said bin adapted to be engaged by said pin whereby the oscillating action of said pin in engaging said track will move said auger forwardly.

References Cited in the file of this patent
UNITED STATES PATENTS

| | | |
|---|---|---|
| 1,482,524 | Robinson | Feb. 5, 1924 |
| 2,675,931 | Makous | Apr. 20, 1954 |